(12) United States Patent
Nordin et al.

(10) Patent No.: US 8,046,639 B1
(45) Date of Patent: Oct. 25, 2011

(54) CYCLE ACCURATE FAULT LOG MODELING FOR A DIGITAL SYSTEM

(75) Inventors: Grace Y. Nordin, Santa Clara, CA (US); Rakesh Mehta, San Jose, CA (US); Kenneth K. Chan, Saratoga, CA (US)

(73) Assignee: Oracle International Corporation, Redwood City, CA (US)

( * ) Notice: Subject to any disclaimer, the term of this patent is extended or adjusted under 35 U.S.C. 154(b) by 0 days.

(21) Appl. No.: 12/846,653

(22) Filed: Jul. 29, 2010

(51) Int. Cl.
*G06F 11/00* (2006.01)

(52) U.S. Cl. .............................. 714/41; 714/32; 714/33

(58) Field of Classification Search ..................... None
See application file for complete search history.

(56) References Cited

U.S. PATENT DOCUMENTS

| | | | | |
|---|---|---|---|---|
| 5,404,496 A * | 4/1995 | Burroughs et al. | ............. | 714/28 |
| 5,475,624 A * | 12/1995 | West | ............... | 703/15 |
| 6,378,124 B1 * | 4/2002 | Bates et al. | .................... | 717/129 |
| 6,539,503 B1 * | 3/2003 | Walker | .......................... | 714/703 |
| 7,137,083 B2 * | 11/2006 | Hildebrant | .................... | 716/112 |
| 7,185,233 B2 * | 2/2007 | Bowers et al. | ................... | 714/41 |
| 7,320,114 B1 * | 1/2008 | Jain et al. | ....................... | 716/106 |
| 2002/0087917 A1 * | 7/2002 | Boehm et al. | ................... | 714/38 |
| 2004/0039966 A1 * | 2/2004 | Petsinger et al. | ............... | 714/28 |

* cited by examiner

*Primary Examiner* — Scott Baderman
*Assistant Examiner* — Jason Bryan
(74) *Attorney, Agent, or Firm* — Marsh Fischmann & Breyfogle LLP; Libby A. Huskey; Kent Lembke (57) ABSTRACT

A system and method for accurately modeling a fault log is provided for validating one or more elements of fault detection and logging logic for a real-time fault log of a digital system such as, for instance, a computer processor. The method includes injecting one or more known faults into a data path and/or a control path of the computer processor and spawning an individual tracking thread for each of the injected faults. The tracking threads may be synchronized at a predefined synchronization point that is selected as a function of a collective logging delay representing the time required for each of the injected faults to reach a real-time logging point within the computer processor. Once synchronized, the tracking threads may be input into a fault logging specification for fault behavior and/or system impact modeling and fault prioritization for use in generating a fault log model for comparison to the real-time fault log maintained within the computer processor.

20 Claims, 4 Drawing Sheets

CYCLE ACCURATE FAULT LOG MODELING FOR A DIGITAL SYSTEM

FIELD OF THE INVENTION

The present invention relates, in general, to validating a digital system's ability to log system faults in real time, and, more particularly, to a system and method of fault log modeling that allows for accurate modeling of multiple different faults and/or multiple faults occurring in close temporal proximity so as to produce an accurate fault log model for cycle-by-cycle comparison to a real-time fault log, thereby enabling a determination regarding whether the real-time fault log is implemented according to design specifications.

BACKGROUND

There has been significant progress made in recent years to facilitate accurate monitoring of the operation of computer or digital systems that experience faults or errors. Today's digital systems (e.g., computer processors, microprocessors) employ fault management techniques that involve the detection, isolation, and correction of faults or errors. For instance, computer processors generally include a combination of system hardware, software, and/or firmware for detecting faults in real time and logging those faults according to a fault logging specification that provides instructions regarding the recognition and prioritization of faults. Generally, the fault logging specification mandates logging of the most severe or detrimental fault so that the most severe error may be addressed or corrected in a timely manner. For example, if a computer processor accesses a data cache (e.g., SRAM) to carry out a read request, and ten bits of data provided in response to the request contain a first error including one incorrect bit and a second error including two incorrect bits, the fault logging specification implemented within the processor may mandate logging the second, more severe error in the computer processor's real-time fault log. In instances where there are multiple faults of equal severity, the design specification may mandate logging the first fault seen by the real-time fault log.

Fault log modeling is often used to validate the digital system's fault detection and logging logic and real-time fault log. That is, fault log modeling is used to verify that the digital system's fault detection and logging logic correctly implements the fault logging specification. To validate the system's fault detection and logging logic, designers seek to confirm whether the system is correctly implementing the fault logging specification such that the system consistently selects the correct or "right" fault for recording in the real-time fault log. Returning to the computer processor example discussed above, one or more faults may be purposefully injected into a data path of the processor. The fault detection logic within the processor may detect the faults and pass them to the fault logging logic, which may apply the fault logging specification to select one of the faults for logging in the processor's real-time fault log. In parallel, an independent fault log modeler may separately analyze the faults to determine which of the injected faults should be selected by the processor for logging in the real-time fault log if the processor's ability to log faults is correctly implemented according to the fault logging specification. This fault is represented in a fault log model. The processor's real-time fault log may then be compared against the fault log model. If the real-time fault log matches the fault log model, then the processor's fault detection and logging logic is correctly implemented according to the fault logging specification.

While existing fault log modeling techniques provide a mechanism for testing a digital system's real-time fault log, they lack the sophistication to stress the system's ability to correctly recognize, prioritize, and log multiple faults occurring in close temporal proximity. That is, existing fault log modeling techniques involve a simplistic cause and effect relationship between fault injection and fault logging, making these techniques useful only in predicting simple fault log behaviors under isolated circumstances in which the injected faults are known. The simplified nature of existing fault modeling methods does not allow for accurate fault modeling of complex, randomized sequences of faults that involve numerous different types of faults or errors, numerous faults occurring over a limited period of time, or both.

Hence, there remains a need for methods and systems for providing more accurate fault log modeling for use in testing and validating a digital system's fault detection and logging logic and real-time fault log under a variety of system conditions, including circumstances in which multiple faults and/or various types of faults occur within close temporal proximity.

SUMMARY

The inventors have recognized that existing techniques for modeling a real-time fault log for a digital system are inadequate in that they are unable to accurately model complex sequences of faults injected into a data path of the system. For example, existing fault log modeling techniques have difficulty modeling sequences of faults that include more than one type of fault, where each different type of fault experiences a different timing delay, or logging delay, between when the fault occurs in the data path and when it reaches a logging point for logging in the real-time fault log of the system.

In addition, because existing fault log modeling techniques recognize, prioritize, and log faults in the order in which they are injected into the data path of the processor, there is a direct cause and effect relationship between each injected fault and the fault log model. As a result, the inventors have recognized that existing fault log modeling techniques are unable to precisely model fault behavior and/or system impacts of faults that are injected into the data path in close temporal proximity. Similarly, existing fault modeling methods fail to recognize when the processor drops or chooses not to use one or more of the injected faults. As a result, these dropped or "unused" faults are oftentimes incorporated into the fault log model, introducing further inaccuracies into the fault log model. These and other issues are addressed with an improved fault log modeling system and method for accurately modeling numerous different types of faults and/or numerous faults occurring over a limited period of time, as discussed below and shown, for example, in FIGS. 1-4.

More particularly, a method is provided for modeling a real-time fault log for faults occurring in a digital system such as, for example, a computer processor. The method initially involves logically connecting a fault injector module to a fault log modeler and the digital system and using the fault injector module to inject one or more faults into a data path and/or a control path of the digital system. The method also includes separately tracking each of the faults injected into the data path. Once the faults are injected, the fault log modeler is used to synchronize the faults at a predefined synchronization point and to generate a fault log model based on the synchronized faults. The method continues on to compare the fault log model against the real-time fault log of the digital system to determine whether the real-time fault log reflects the correct injected fault, or to validate one or more elements of fault detection and logging logic associated with the real-time fault log.

The injected faults may include any appropriate faults or errors experienced in the digital system. For example, the injected faults may include one or more memory errors, interface errors, protocol errors, and/or logic errors. In one implementation, the step of separately tracking each of the faults injected into the data path may involve spawning (e.g., initiating or creating) a tracking thread for each of the faults. In this embodiment, the step of synchronizing the faults may involve synchronizing the tracking threads at the predefined synchronization point.

The faults may be injected into the data path and/or the control path at the same or different clock cycles of the digital system. In this regard, the predefined synchronization point may be a predetermined clock cycle that is selected as a function of one or more different logging delays between when the faults are injected into the data path and when the faults reach a logging point for logging in the real-time fault log of the computer processor.

In one embodiment, the faults may be randomly injected into the data path and/or the control path or injected in any appropriate and/or desirable sequence and with any appropriate and/or desirable timing. For example, the faults may be randomly injected during a single clock cycle, over consecutive clock cycles, or spaced between numerous clock cycles. Moreover, in some implementations, the step of inputting the synchronized faults (e.g., the synchronized tracking threads) into the fault logging specification may provide a behavior and/or system impact model for each of the injected faults. Understanding the true impact of each of the faults, regardless of the sequence and/or timing of the fault injection, assists in generating a fault log model that accurately reflects the injected fault having the most severe or detrimental impact on the system.

The method may further involve, prior to the step of synchronizing the faults (e.g., the tracking threads), detecting one or more unused faults from among the faults injected into the data path and/or the control path, where the unused faults are not used by the computer processor, and terminating any unused tracking threads that correspond to the unused faults. Thus, in one embodiment, the tracking threads that correspond to the dropped or unused faults are not synchronized and input to the fault logging specification for incorporation into the fault log model. In this regard, unused faults are discarded or ignored such that they do not skew the fault log model.

A system is also provided for modeling a real-time fault log of a digital system. The system includes a fault injector module that operates to inject at least first, second, and third faults into one or both of a data path and a control path of the digital system and a fault log modeler that is logically associated with the fault injector module. The fault log modeler operates to spawn first, second, and third tracking threads for the first, second, and third faults, respectively. The fault log modeler also operates to detect that one of the faults (e.g., the first fault) is not used by the digital system and, in response, to terminate a corresponding tracking thread (e.g., the first tracking thread) before synchronizing any remaining tracking threads (e.g., the second and third tracking threads). Once synchronized, the remaining tracking threads are input into a fault logging specification to model a behavior for each of the remaining faults to calculate a fault log model.

In one implementation, each of the first, second, and third faults may be associated with different first, second, and third delays to reach a logging point for logging in the real-time fault log of the computer processor. Further, the fault log modeler may synchronize the remaining tracking threads at a predefined synchronization point, which may be set at a predefined clock cycle that is selected as a function of one or more of the first, second, and third delays.

The fault log modeler may further operate to compare the fault log model against the real-time fault log. Regardless of whether the first, second, and/or third tracking threads have reached the synchronization point, this comparison may be made within each clock cycle to achieve a cycle-by-cycle comparison between the fault log model and the real-time fault log.

Another aspect provides a computer program product including a computer useable medium and computer readable code embodied on the computer useable medium for performing accurate modeling of a real-time fault log of a computer processor. The computer readable code includes computer readable program code devices configured to cause a computer to inject one or more faults into one or both of a data path and a control path of the computer processor as well as computer readable program code devices configured to track each of the faults injected into the data path. The computer readable code also includes computer readable program code devices configured to cause the computer to synchronize the faults at a predefined synchronization point set at a predetermined clock cycle. The predetermined synchronization point is selected as a function of one or more logging delays between when the faults are injected into the data path and when the faults reach a logging point to logging in the real-time fault log of the computer processor. The computer readable program code devices are also configured to generate a fault log model according to a fault logging specification and to compare the fault log model against the real-time fault log of the computer processor to validate the real-time fault log.

In one implementation, each of the logging delays may be different. In other applications, the computer readable code may further include readable program code devices configured to cause the computer to detect at least one unused fault that is not used by the computer processor and to discard the unused fault before it reaches the predefined synchronization point so that the unused fault will not be considered in generating the fault log model.

DETAILED DESCRIPTION OF EXEMPLARY EMBODIMENTS

The following description describes exemplary embodiments of a system and method for validating a digital system's fault detection and logging logic and real-time fault log on a cycle-by-cycle basis, allowing for a more accurate assessment of a digital system's ability to correctly recognize, prioritize, and log multiple different faults occurring in close temporal proximity. The systems and methods described below generally include randomly injecting one or more faults into a data and/or control path of a digital system and separately tracking each of the injected faults. The faults may be monitored for a delay period before they are synchronized and input, along with a previous fault log model, into a fault logging specification (e.g., a software subroutine) to generate a new fault log model that accurately accounts for the behavior of each of the injected faults.

The inventors have recognized that existing fault log modeling methods involve significant disadvantages that impair their ability to accurately model real-time fault logs. For example, existing modeling techniques parrot the manner in which the digital system generates the real-time fault log in that existing techniques attempt to recognize, prioritize, and log faults consecutively as they occur in the system. This results in a direct cause and effect relationship between each injected fault and the fault log model. As a result, current fault log modeling techniques lack the complexity to model fault behavior and/or system impact accurately when numerous faults are injected in close temporal proximity, such as over one or only a few processor clock cycles. By individually tracking each randomly injected fault, the systems and methods described below ensure that the behavior of each and every injected fault is considered in generating the fault log model, with no restrictions on the number or temporal proximity of the injected faults. This allows for robust stress testing of the system's fault logging mechanism.

In addition, different types of faults experience different timing delays, or logging delays, between when the fault occurs in the system and when the fault reaches a real-time logging point within the system. These logging delays impact the system's recognition and prioritization of faults for recording in the real-time fault log. As a result, the fault log modeling systems and methods described below account for (e.g., store) the various logging delays associated with different types of faults or errors. Unlike existing fault logging techniques, the systems and methods described below are able to access the various logging delays associated with different types of faults and can account for the various logging delays in modeling fault behavior so as to generate a fault log model that accurately identifies either the most detrimental fault or the first fault among two or more faults that are equally severe for logging in the real-time fault log of the digital system.

Moreover, there are instances where the digital system chooses not to use data associated with one or more of the injected faults. In these instances in which certain faults remain unused, the system may simply drop the unused faults. Traditional fault log modeling methods lack the ability to detect whether the system has dropped one or more of the injected faults. In contrast, the fault log modeling systems and methods described below are aware of the transactions occurring in the digital system in real-time. As a result, the inventive system and methods may detect dropped faults and mask them as "unused" so as to avoid recognizing the unused faults and modeling the behavior of the unused faults in generating the fault log model (e.g., to ignore/discard these unused faults in contrast to prior fault modeling methods).

Figure 1:
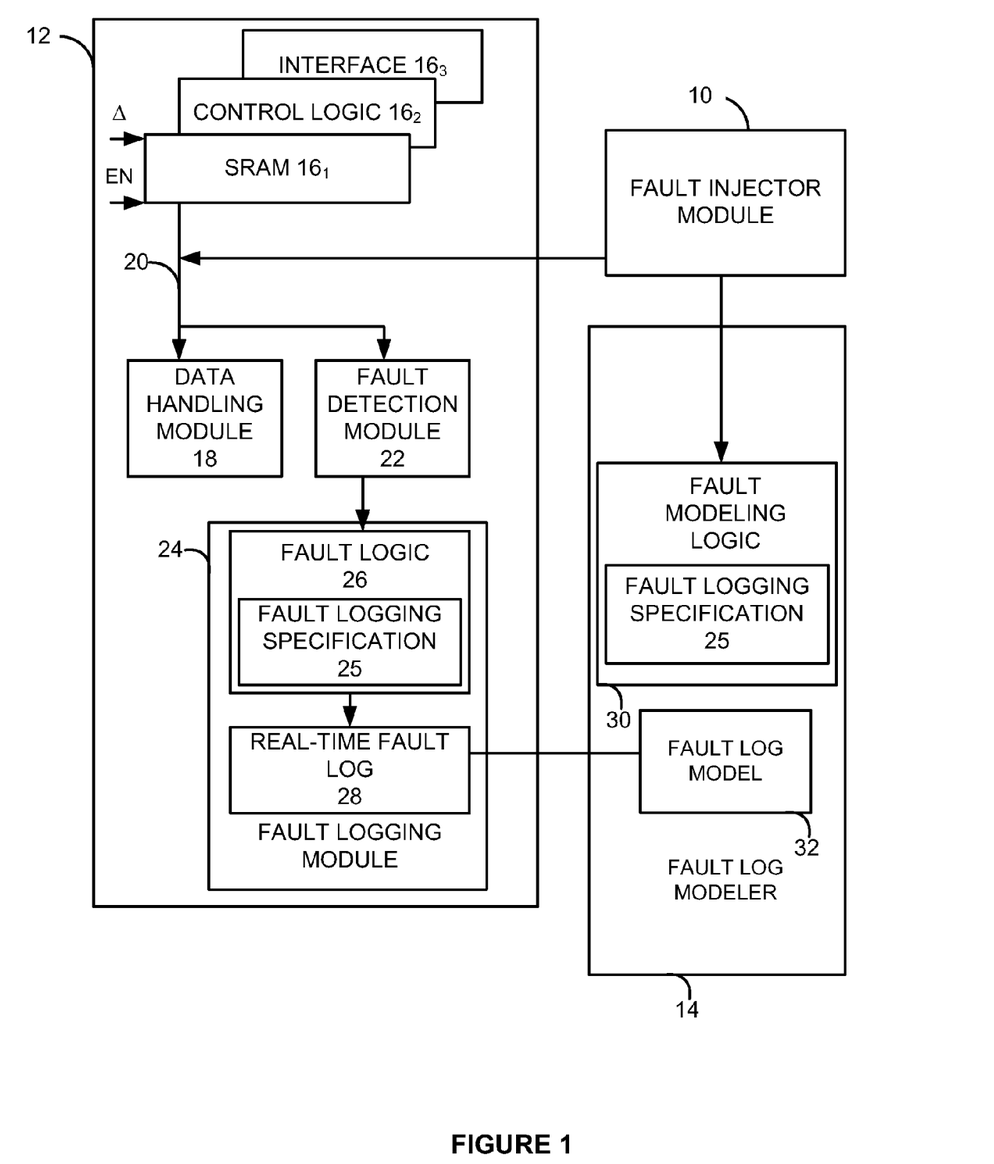
FIG. 1 illustrates a functional block diagram of a fault injector module as logically connected between a computer processor and a fault log modeler.

In one specific implementation, FIG. 1 illustrates a functional block diagram of an exemplary digital system, or, in this embodiment, a computer processor 12 including any appropriate combination of fault detection and logging logic. The processor 12 may be a general or special purpose microprocessor that receives instructions and data from a read-only memory, random access memory, or both. The computer processor 12 may include one or more functional blocks 16. For instance, the processor 12 may include an SRAM $16_1$, a control logic block $16_2$, an interface $16_3$, and/or any other appropriate functional block associated with the processor 12. Throughout this discussion, the terms module, functional block, logic block and/or logic are used to describe one or more logical elements that may be distributed throughout the system and that may be implemented in hardware, software, firmware, or any combination thereof.

In one implementation, the SRAM $16_1$ may be communicatively coupled with a data handling module 18 through a data path 20. A fault detection module 22 may monitor the data path 20 to ensure that the data passing to the data handling module 18 is not in error. In this embodiment, when faults are present in the data path 20, the fault detection module 22 may detect the faults or errors in the data path 20 and pass each of the faults to a fault logging module 24 for prioritization and logging in a real-time fault log 28 after an inherent logging delay that varies for each type of fault detected. In operation, the fault detection module 22 and the fault logging logic 24 implement a fault logging specification 25 for the detection, prioritization, and logging of faults in the real-time log 28.

The faults occurring in the data path 20 of the processor 12 may originate in the SRAM $16_1$ or they may originate in any system component and/or data path that is upstream from and feeds into the SRAM $16_1$. In other embodiments, faults may occur within a control path associated with the control logic $16_2$ or in any other appropriate logical element of the processor 12. The faults occurring in the processor 12 may be any appropriate type of intermittent faults (e.g., caused by radiation and/or noise) and/or hard faults (e.g., caused by manufacturing defects, aging, and/or electro-migration) experienced within the processor 12. For example, the faults may include memory errors, logic errors, interface errors, protocol errors, parity errors, checksum errors, and so on, depending on the processor's error protection scheme and a location/origination of the fault within the processor 12.

In further detail, the fault logging module 24 may include fault logic 26 that implements the fault logging specification 25 to examine the behavior and/or system impact associated with each of the detected faults before prioritizing the faults for logging in the real-time fault log 28. The fault logging specification 25 may involve any appropriate computer-implemented instructions, processes, and/or logic flows regarding modeling fault behavior and/or system impact and a resulting prioritization of faults for logging. Generally, the most severe or detrimental fault is selected for logging in the real-time fault log 28 of the processor 12. If two or more faults are equally severe, then the fault logic 26 may select the earliest fault for logging in the real-time fault log 28.

To validate the processor 12 and verify that the fault detection module 22 and the fault logging module 24 correctly implement the fault logging specification 25, the processor 12 may be logically connected with a fault injector module 10 and a fault log modeler 14. The validation process confirms whether the fault logging module 24 consistently identifies either the fault that will most severely impact operation of the system or, in the case to two or more equally severe faults, the earliest occurring fault. Validation of the processor's real-time fault logging mechanism is important because the real-time fault log 28 is a key diagnostic component of the processor 12 and is instrumental in directing resources to isolate and/or address system faults in a timely manner, assuring customers that the most catastrophic faults will be prioritized and addressed accordingly. If the fault detection module 22 and the fault logging module 24 fail to detect, prioritize, and log faults as specified in the fault logging specification 25, then the processor 12 is not qualified for proper self-diagnosis and may detrimentally impact the operation of a larger digital system.

The fault injector module 10 and the fault log modeler 14 may collaborate to validate the fault detection and logging logic and the real-time fault log 28 using fault log modeling. In general, the fault injector module 10, the fault log modeler 14, and each of their respective components may take any appropriate form and may include any appropriate combination and/or distribution of computer hardware, software, and/or firmware and shared data storage. In addition, while the process of fault log modeling is described below with respect to specific components of the fault injector module 10 and/or the fault log modeler 14, the process of fault log modeling may be implemented by or at any appropriate component of either the fault injector module 10 and/or the fault log modeler 14 or it may be distributed throughout various components of the fault injector module 10 and/or the fault log modeler 14.

With this in mind, the fault injector 10 may inject one or more faults into the data path 20 of the processor 12. The injected faults may differ in type and the types of faults may include any faults that traditionally occur in the processor 12. For example, as discussed above, the faults may include memory errors, logic errors, interface errors, protocol errors, parity errors, checksum errors, and so on. In this embodiment, the act of injecting the faults into the data path 20 may involve injecting the faults directly into the data path 20 itself (i.e., flipping data bits in the data path 20), as shown in FIG. 1, or it may involve altering an output of a functional block such as the SRAM $16_1$ or the interface $16_3$ in a manner that causes the fault or faults to originate within the functional block 16 or any other system component that is upstream from and feeds into the functional block 16. While the injected faults may involve the data path 20, as shown in FIG. 1, the fault injector 10 may also inject one or more faults into the control logic $16_2$ of the processor 12 and/or any other appropriate functional block of the processor 12.

In one embodiment, the fault log modeler 14 may include fault modeling logic 30 that implements the fault logging specification 25 in a manner that ensures that the behavior and/or system impact of each and every injected fault is modeled, allowing for accurate prioritization of faults to generate a fault log model 32 that identifies the correct or "right" answer from among the injected faults. That is, the fault modeling logic 30 may implement the fault logging specification 25 to determine which one of the injected faults the real-time fault log 28 of the processor 12 should identify if the processor's ability to log faults is implemented as specified. Notably, the fault modeling logic 30 of the fault log modeler 14 and the fault logging module 24 of the processor 12 each implement the fault logging specification 25. That said, the implementation of the specification 25 within the fault log modeler 14 differs from the implementation of the specification 25 within the processor 12, allowing the fault log modeler to perform an effective check on the implementation of the specification 25 within the processor 12.

Within each processor clock cycle, the fault log model 32 of the fault modeler 14 and the real-time fault log 28 of the processor 12 may be compared to determine whether the fault detection module 22 and the fault logging module 24 are performing as specified to generate the real-time fault log 28. Notably, because the fault log modeler 14 is consistently able to independently track and analyze each fault, as detailed below with reference to FIGS. 2-4, the fault log modeler 14 is able to generate an accurate fault log model 32 even in complex fault scenarios. For example, the fault modeler 14 is able to accurately generate the fault log model 32 when numerous randomized faults are injected in close temporal proximity or when various types of faults, each having a different logging delay that may be stored in memory within the fault log modeler 14, are injected into the data path 20 of the processor 12.

Figure 2:
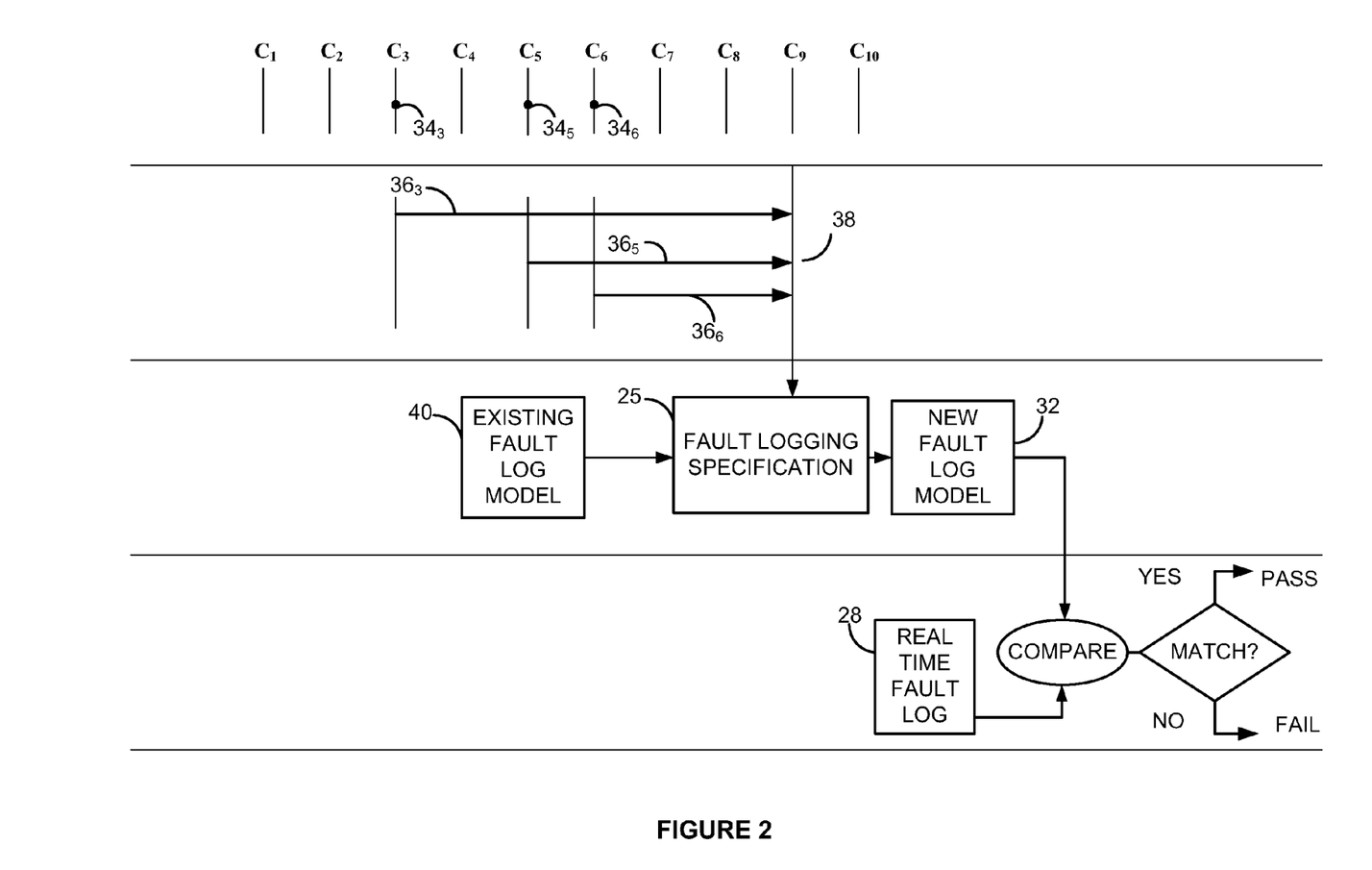
FIG. 2 graphically illustrates an exemplary embodiment of fault modeling functionally in instances where the fault injector module of FIG. 1 injects only one fault per processor clock cycle.

FIG. 2 graphically depicts one embodiment of fault modeling functionally in instances where the fault injector module 10 (FIG. 1) injects only one fault per clock cycle. Specifically, in this embodiment, the fault injector module 10 (FIG. 1) may inject three faults $34_3$, $34_5$, and $34_6$ at clock cycles $C_3$, $C_5$, and $C_6$, respectively. In response, either the fault injector module 10 (FIG. 1) or the fault modeling logic 30 (FIG. 1) may spawn (e.g., initiate or create) corresponding tracking threads $36_3$, $36_5$, and $36_6$ for each of the faults $34_3$, $34_5$, and $34_6$, respectively. Because the fault modeling logic 30 is aware of the logging delay associated with each of the injected faults $34_3$, $34_5$, and $34_6$ (e.g., the fault modeling logic 30 accesses delay values per fault type that have been stored in a memory structure accessible to the fault modeling logic 30), the system is able to calculate or define a synchronization point 38, at which the tracking threads $36_3$, $36_5$, and $36_6$ are synchronized and input, along with an existing fault log model 40, to the fault logging specification 25 (FIG. 1) that is implemented within the fault modeling logic 30 (FIG. 1).

Using the tracking threads $36_3$, $36_5$, and $36_6$, the fault logging specification 25 (FIG. 1) may model the behavior and/or system impact of each of the faults $34_3$, $34_5$, and $34_6$ in an appropriate order such that the faults $34_3$, $34_5$, and $34_6$ may be accurately prioritized to update the existing fault log model 40 and generate a new fault log model 32 (FIG. 1) that correctly identifies the most severe fault from among the faults $34_3$, $34_5$, and $34_6$. That is, the fault logging specification 25 implemented within the fault log modeler 14 may model how (and when) each of the injected faults $34_3$, $34_5$, and $34_6$ will impact the operation of the processor 12. Using that information, the faults $34_3$, $34_5$, and $34_6$ may be prioritized according to severity and/or timing, and the existing fault log model 40 may be updated to generate the new fault log model 32 that reflects the highest priority fault.

The new fault log model 32 may then be compared to the real-time fault log 28 from the processor 12 (FIG. 1). If the new fault log model 32 and the real-time fault log 28 match, then the fault detection module 22 (FIG. 1) and the fault logging module 24 (FIG. 1) of the processor 12 are functioning as specified and the processor 12 passes validation. If the new fault log model 32 and the real-time fault log 28 do not match, then the fault detection module 22 (FIG. 1) and the fault logging module 24 (FIG. 1) of the processor 12 are not functioning as specified and the processor 12 fails validation. Any failures may be documented (e.g., stored within memory assessable to the modeler 14) for further investigation relating to the cause of the failure (e.g., problems with the implementation of the fault logging specification 25 within the processor 12 and/or where implementation problems originate with the processor 12).

Beyond comparing the fault log model 32 and the real-time fault log 28 at the synchronization point 38, which occurs at cycle $C_9$ in this embodiment, the fault log model 32 and the real-time fault log 28 may be compared during each cycle. In this regard, the real-time fault log 28 is validated on a cycle-by-cycle basis to detect and/or monitor any spurious or unexpected changes reflected in the real-time fault log 28 during cycles in which no injected faults reach the synchronization point (e.g., cycles $C_1$-$C_8$ and $C_{10}$.

Figure 3:
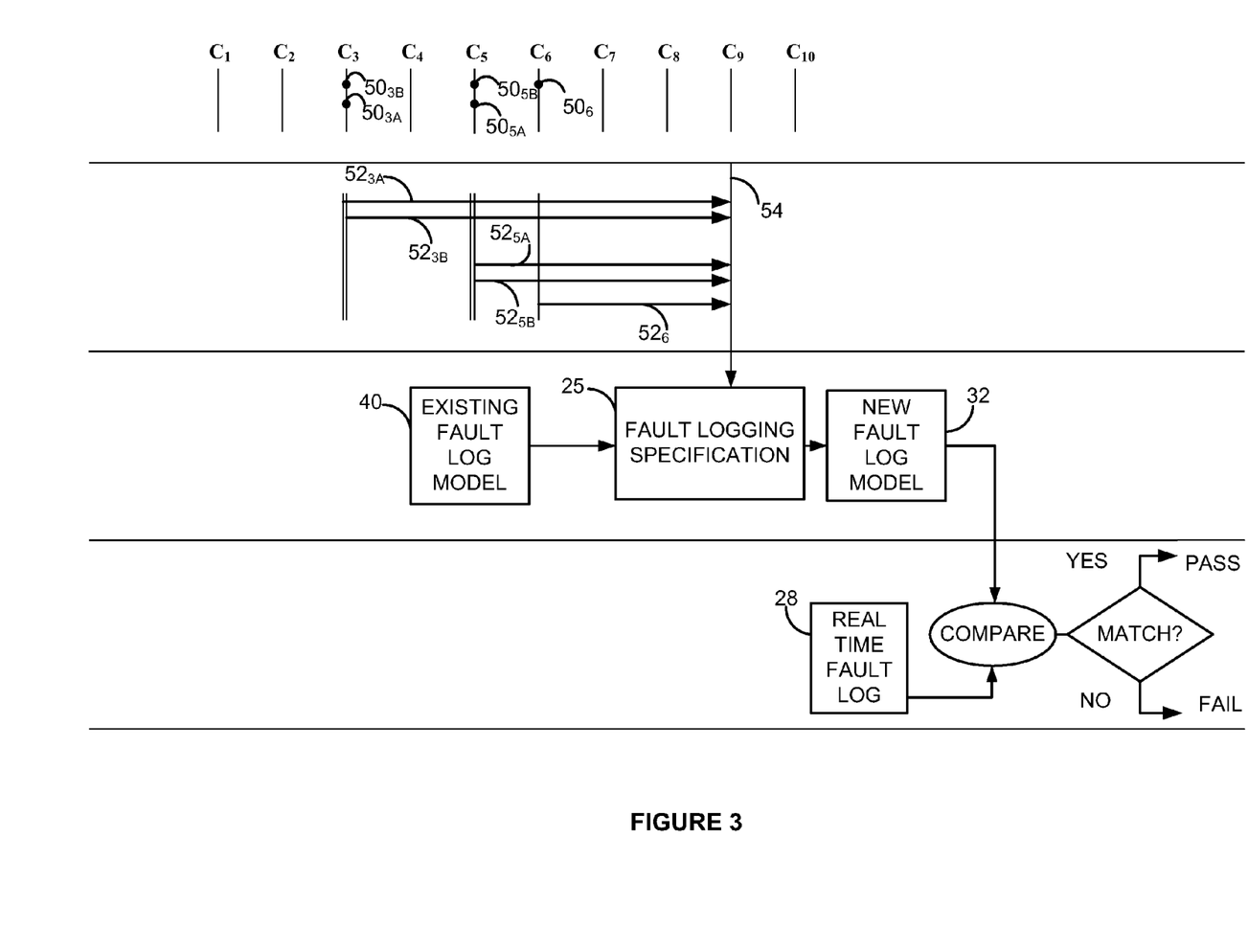
FIG. 3 graphically illustrates an exemplary embodiment of fault modeling functionally in instances where the fault injector module of FIG. 1 injects multiple faults per processor clock cycle.
Figure 4:
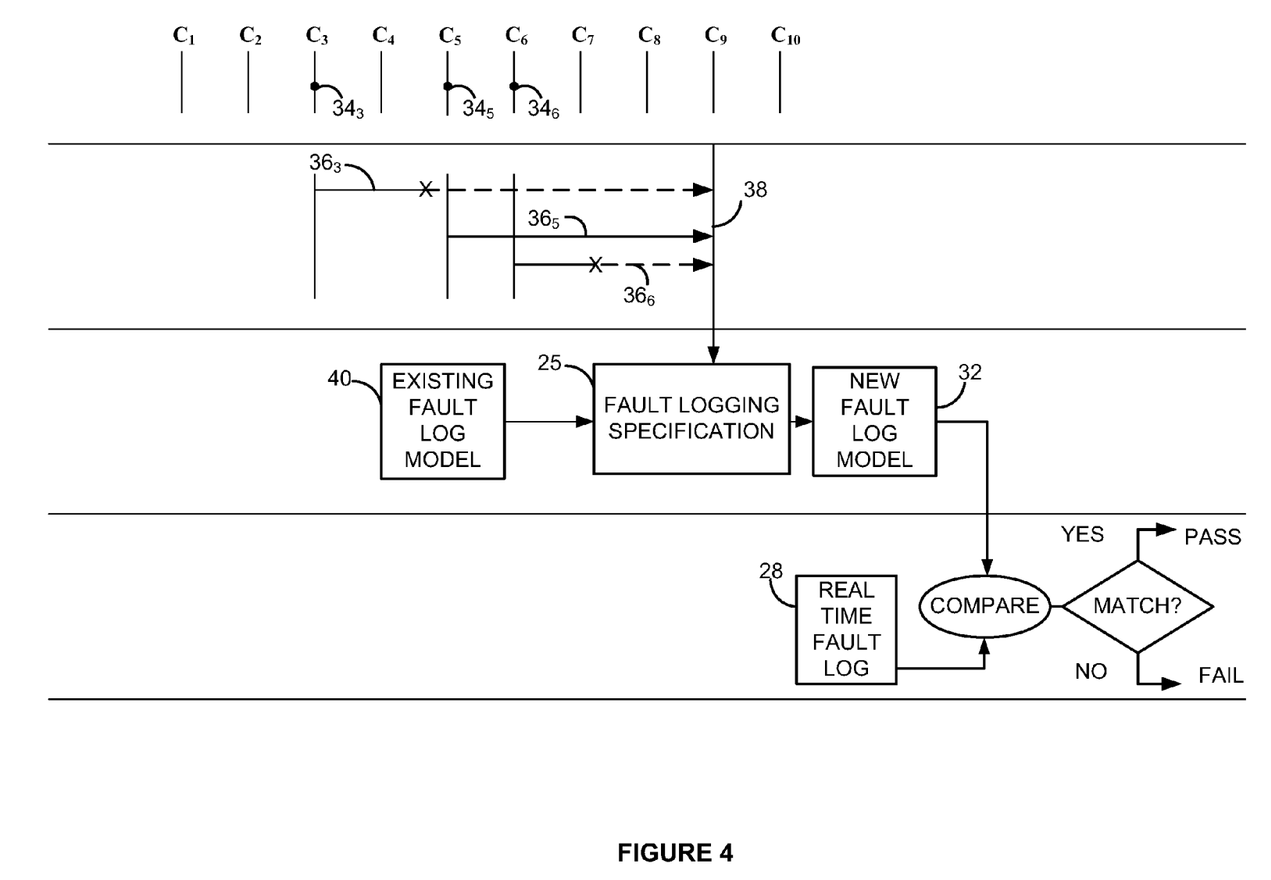
FIG. 4 graphically illustrates an exemplary embodiment of fault modeling functionally in which the fault injector module of FIG. 1 masks faults that are unused by the computer processor of FIG. 1.

FIG. 3 graphically depicts another embodiment of fault modeling functionally in instances where the fault injector module 10 (FIG. 1) injects multiple faults per clock cycle. For instance, in one embodiment, the fault injector module 10 (FIG. 1) may inject two faults $50_{3A}$, $50_{3B}$ at clock cycle $C_3$, two more faults $50_{5A}$, $50_{5B}$ at clock cycle C5, and a single fault $50_6$ at clock cycle $C_6$. In response, the fault modeling logic 30 (FIG. 1) may spawn corresponding tracking threads $52_{3A}$, $52_{3B}$, $52_{5A}$, $52_{5B}$, and $52_6$ for each of the faults $50_{3A}$, $50_{3B}$, $50_{5A}$, $50_{5B}$, and $50_6$, respectively. Again, because the fault modeling logic 30 (FIG. 1) is aware of the logging delay associated with each of the injected faults $50_{3A}$, $50_{3B}$, $50_{5A}$, $50_{5B}$, and $50_6$, the system is able to calculate or define a synchronization point 54, at which the tracking threads $52_{3A}$, $52_{3B}$, $52_{5A}$, $52_{5B}$, and $52_6$ are synchronized and input, along with the existing fault log model 40 (FIG. 2), to the fault logging specification 25 (FIG. 1) that is implemented within the fault modeling logic 30 (FIG. 1).

Using the unique tracking threads $52_{3A}$, $52_{3B}$, $52_{5A}$, $52_{5B}$, and $52_6$, the fault logging specification 25 may model the behavior and/or system impact of each of the faults $50_{3A}$, $50_{3B}$, $50_{5A}$, $50_{5B}$, and $50_6$ in an appropriate order despite the fact that a diverse series of temporally proximate faults was initially injected into the data path 20 (FIG. 1). This ability to independently analyze the faults in parallel allows the fault modeling logic 30 to accurately model the behavior of each independent fault such that the faults $50_{3A}$, $50_{3B}$, $50_{5A}$, $50_{5B}$, and $50_6$ may be prioritized correctly in updating the existing fault log model 40 and generating the new fault log model 32. As discussed above, the new fault log model 32 may be compared to the real-time fault log 28 from the processor 12 (FIG. 1). If the new fault log model 32 and the real-time fault log 28 match, then the fault logging module 24 (FIG. 1) of the processor 12 is functioning as specified and the processor 12 passes validation. If the new fault log model 32 and the real-time fault log 28 do not match, then the fault detection module 22 (FIG. 1) and the fault logging module 24 (FIG. 1) of the processor 12 are not functioning as specified and the processor 12 fails validation. As discussed above, if the processor 12 fails validation, the log records may be stored for later examination regarding the cause of the failure. This may provide insight into design changes relating to the manner in which the specification 25 is implemented within the processor 12.

In another implementation, the fault injector module 10 and/or the fault log modeler 14 may be aware of the transactions occurring in the processor 12 in real time such that they may detect instances in which the processor 12 does not use data associated with one or more of the injected faults. In these instances in which the processor 12 drops unused faults, the fault log modeler 14 may mask as "unused" any tracking threads that are associated with the dropped faults, essentially terminating the threads before they reach the synchronization point. To demonstrate, FIG. 4 graphically depicts an embodiment of fault modeling functionality that is similar to the embodiment shown in FIG. 2. In this embodiment, however, the fault log modeler 14 (FIG. 1) detects that the processor 12 has dropped the faults $34_3$ and $34_6$. In response, the fault log modeler 14 (FIG. 1) masks the faults as "unused," and the tracking threads $36_3$ and $36_6$ are terminated before reaching the synchronization point 38. Thus, only the tracking thread $36_5$ is input to the fault logging specification 25 along with the existing fault log model 40 for use in generating the new fault log model 32. Thus, the dropped faults $34_3$ and $34_6$ are not taken into account in generating of the new fault log model 32, which prevents the unused faults from artificially skewing the model 32.

Although the invention has been described and illustrated with a certain degree of particularity, it is understood that the present disclosure has been made only by way of example, and that numerous changes in the combination and arrangement of components may be used by those skilled in the art without departing from the spirit and scope of the invention, as hereinafter claimed. For instance, while the fault modeling logic is generally described as spawning a tracking thread for each injected fault, the fault injector module may also spawn the tracking threads and pass them to the fault modeling logic. Moreover, the processes and logic flows described in this specification may be performed by any appropriate combination of hardware, software, and/or firmware.

We claim:

1. A method of modeling a real-time fault log for faults occurring in a digital system, comprising:
    logically connecting a fault injector module to a fault log modeler and said digital system;
    using said fault injector module, injecting one or more faults into one or both of a data path and a control path of said digital system;
    separately tracking each of said faults injected into said data path;
    using said fault log modeler to:
        synchronize said faults at a predefined synchronization point; and
        generate a fault log model based on said synchronized faults; and
    comparing said fault log model against a real-time fault log of said digital system to validate one or more elements of fault detection and logging logic for said real-time fault log.

2. The method of claim 1, wherein said generating comprises inputting said synchronized faults into a fault logging specification executing in said fault log modeler.

3. The method of claim 2, wherein said inputting said synchronized faults into said fault logging specification provides a behavior model for each said fault.

4. The method of claim 1, wherein said separately tracking comprises spawning a tracking thread for each of said faults injected into said data path or said control path, and wherein said synchronizing comprises synchronizing said tracking threads at said predefined synchronization point.

5. The method of claim 4, further comprising, prior to said synchronizing said tracking threads:
    detecting one or more unused faults from among said faults injected into said data path or said control path, wherein said unused faults are not used by said digital system;
    terminating any unused tracking threads, wherein said unused tracking threads correspond to said unused faults.

6. The method of claim 4, wherein said predefined synchronization point comprises a predetermined clock cycle that is selected as a function of one or more logging delays between when said faults are injected into said data path or said control path and when said faults reach a logging point for logging in said real-time fault log of said computer processor.

7. The method of claim 6, wherein each said logging delay is different.

8. The method of claim 1, wherein said faults comprise one or more of memory errors, interface errors, protocol errors, and logic errors.

9. A fault log modeling system for modeling a real-time fault log of a digital system, comprising:
- a fault injector module implemented on a computer processor, said fault injector module operative to inject at least first, second, and third faults into one or both of a data path and a control path of said digital system; and
- a fault log modeler logically associated with said fault injector module, wherein said fault log modeler operates to:
- spawn first, second, and third tracking threads for said first, second, and third faults, respectively;
- detect that said first fault is not used by said digital system and, in response, terminate said first tracking thread;
- synchronize said second and third tracking threads; and
- input said second and third tracking threads into a fault logging specification to model a behavior for each of said second and third faults to calculate a fault log model.

10. The fault log modeling system of claim 9, wherein each of said first, second, and third faults are associated with first, second, and third delays to reach a logging point for logging in said real-time fault log of said digital system.

11. The fault log modeling system of claim 10, wherein two or more of said first, second, and third delays are different.

12. The fault log modeling system of claim 10, wherein said fault log modeler synchronizes said second and third tracking threads at a predefined synchronization point, and wherein said predefined synchronization point comprises a predetermined clock cycle that is selected as a function of one or more of said first, second, and third delays.

13. The fault log modeling system of claim 9, wherein said digital system comprises a computer processor.

14. The fault log modeling system of claim 9, wherein said fault log modeler further operates to compare said fault log model against said real-time fault log during each clock cycle of said computer processor in order to validate one or more elements of fault detection and logging log for said real-time fault log.

15. The fault log modeling system of claim 9, wherein said fault injector module operates to inject said first, second, and third faults in close temporal proximity, and wherein said close temporal proximity comprises fewer than five clock cycles.

16. The fault log modeling system of claim 9, wherein said first, second, and third faults each comprise one of a memory error, an interface error, a protocol error, and a logic error.

17. A computer program product comprising a non-transitory computer useable medium and computer readable code embodied on the computer useable medium for performing accurate modeling of a real-time fault log of a computer processor, the computer readable code comprising:
- non-transitory computer readable program code devices configured to cause a computer to inject one or more faults into at least one of a data path and a control path of said computer processor;
- non-transitory computer readable program code devices configured to cause the computer to track each said fault injected into said data path or said control path;
- non-transitory computer readable program code devices configured to cause the computer to synchronize said faults at a predefined synchronization point, wherein said predefined synchronization point comprises a predetermined clock cycle selected as a function of one or more logging delays between when said faults are injected into said data path and when said faults reach a logging point for logging in said real-time fault log of said computer processor;
- non-transitory computer readable program code devices configured to cause the computer to generate a fault log model of said faults according to a fault logging specification; and
- non-transitory computer readable program code devices configured to cause the computer to compare said fault log model against said real-time fault log of said computer processor to validate one or more elements of fault detection and logging logic for said real-time fault log.

18. The computer program product of claim 17, wherein each said fault comprises one of a memory error, an interface error, a protocol error, and a logic error.

19. The computer program product of claim 17, wherein each of said logging delays is different.

20. The computer program product of claim 18, further comprising computer readable program code devices configured to cause the computer to detect at least one unused fault that is not used by said computer processor and to discard said unused fault before said unused fault reaches said predefined synchronization point.

* * * * *

UNITED STATES PATENT AND TRADEMARK OFFICE
CERTIFICATE OF CORRECTION

| | | |
|---|---|---|
| PATENT NO. | : 8,046,639 B1 | Page 1 of 1 |
| APPLICATION NO. | : 12/846653 | |
| DATED | : October 25, 2011 | |
| INVENTOR(S) | : Nordin et al. | |

It is certified that error appears in the above-identified patent and that said Letters Patent is hereby corrected as shown below:

In column 9, line 2, delete "$C_{10}$." and insert -- $C_{10}$). --, therefor.

In column 10, line 52, in Claim 5, after "system;" insert -- and --.

Signed and Sealed this
Twenty-seventh Day of December, 2011

David J. Kappos
*Director of the United States Patent and Trademark Office*